J. H. HASKINS & D. B. DENISON.
Screw-Cutting Tools for Metal-Lathes.

No. 146,450. Patented Jan. 13, 1874.

UNITED STATES PATENT OFFICE.

JAMES H. HASKINS AND DANIEL B. DENISON, OF GROTON, CONNECTICUT.

IMPROVEMENT IN SCREW-CUTTING TOOLS FOR METAL-LATHES.

Specification forming part of Letters Patent No. 146,450, dated January 13, 1874; application filed October 28, 1873.

*To all whom it may concern:*

Be it known that we, JAMES H. HASKINS and DANIEL B. DENISON, of the town of Groton, county of New London, State of Connecticut, have invented certain Improvements in Thread-Cutting Tools, as used in a lathe or lathes, of which the following is a specification:

This our invention consists in the use, application, and combination of two movable adjustable cutters, fashioned and shaped, as to the cutting-edge thereof, according to the thread to be cut, (with one beveled side, to give clearance, in the case of cutters designed to cut a square thread,) so set and arranged in the holder that they shall be upon and present their cutting-edges to opposite sides of the bar upon which the thread is to be cut. The object of our invention is, with one holder, one tool-post, and one carriage, by moving the carriage as the lathe is reversed, to cut a thread as well on the backward motion of the lathe as on the forward motion.

Figure 1:
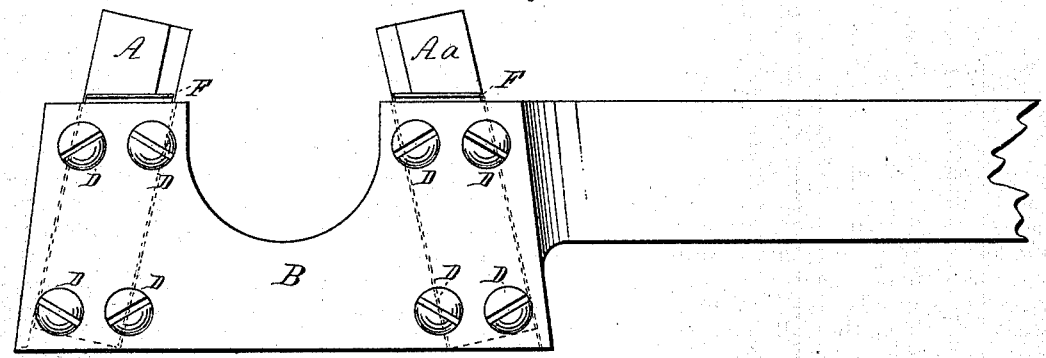
Figure 2:
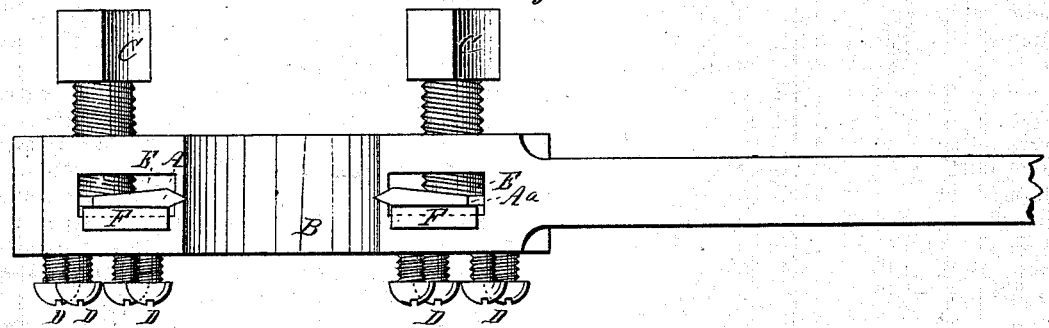
Figure 3:
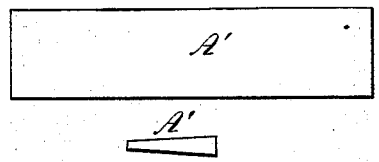

Figure 1 is a side view of a holder embodying our invention. Fig. 2 is a vertical view of the same.

A A *a* A' A' are cutters of best cast-steel. In Fig. 1, A *a* is the cutter which cuts the thread on the forward motion of the lathe, as does the cutter in ordinary use. A is the cutter which operates on backward motion of the lathe. These cutters are the shape used in cutting the V-shaped thread, so called. A' and A' are cutters for cutting the "square" thread. B is the holder, through which are cut the slots E E for the reception of the cutters A and A *a*. C' C are two set-screws, by means of which the cutters are held in place in the slots E E. D D are eight gib-screws, which adjust the cutters to the required pitch. F is the gib.

The bar upon which the thread is to be cut is put in the lathe. The holder B is adjusted in the tool-post of the slide-rest. The cutters A and A *a* having been set to any required pitch, so that the cutter A *a* strikes the bar at or toward the dead-center end of the lathe, or the end opposite where the power is applied, and the lathe then being put in motion, the thread is cut on the bar as the carriage traverses the distance to be cut. When the carriage reaches the end of the cut, the lathe is reversed. The cutter A *a* is moved back from the bar by means of the adjusting-screw and screw-handle of the slide-rest. The cutter A is, by this motion, brought to bear upon the opposite side of the bar, and, as the carriage moves back toward the dead-center, cuts the thread on the backward motion to the place of beginning, thus saving the time usually lost on the unproductive backward motion.

We make no claim for any motion of the lathe; but

We claim as our invention—

The within-described duplex screw or thread cutting tool, consisting of the stock B, provided with the slots E E, gibs F F, screws D D D D D D, set-screws C C, and cutters A A *a*, arranged substantially as and for the purposes set forth.

JAMES H. HASKINS.
DANIEL B. DENISON.

Witnesses:
R. LATHAM MILLER,
FRED. A. HOLMES.